(12) United States Patent
Amemiya

(10) Patent No.: US 6,768,637 B1
(45) Date of Patent: Jul. 27, 2004

(54) INFORMATION PROCESSING UNIT AND BATTERIES

(75) Inventor: Ryoji Amemiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/569,877

(22) Filed: May 12, 2000

(30) Foreign Application Priority Data

May 19, 1999 (JP) .......................................... P11-139262

(51) Int. Cl.[7] .............................................. G06F 1/16
(52) U.S. Cl. ...................... 361/683; 361/684; 361/686; 361/727; 429/98; 439/500
(58) Field of Search ................................. 361/683, 686, 361/679–682, 685–687, 724–727; 429/96–100; 16/110.5, 223; 364/708.1; 312/223.1, 223.2; 200/52 R; 439/500

(56) References Cited

U.S. PATENT DOCUMENTS 5,901,035 A * 5/1999 Foster et al. ................ 361/683
6,002,583 A * 12/1999 Shoji et al. .................. 361/683
6,191,941 B1 * 2/2001 Ito et al. ...................... 361/683
6,452,795 B1 * 9/2002 Lee ............................. 361/686

* cited by examiner

Primary Examiner—Michael Datskovskiy
(74) Attorney, Agent, or Firm—Jay H. Maioli

(57) ABSTRACT

An information processing unit and batteries which can be carried with ease even if the batteries have been attached. Includes a main body division for executing given information processing; a first battery division which is attached to the first surface on the rear side of the main body division and is standing out from a second surface adjoining the first surface of the main body division; and a second battery division which is held onto an edge portion on the side of the first battery division which the edge portion stands out from the second surface, such that it can rotate freely in a direction to approach the main body division and also in the reverse direction to depart from the main body division, and one surface of the second battery hits the second surface when rotated in the direction to approach the main body division. Therefore, at the time of carrying the main body division, the first and the second battery divisions can be caused to lie along the first and second surfaces of the main body division so that the first and the second battery divisions can be integrated with the main body division.

20 Claims, 8 Drawing Sheets

INFORMATION PROCESSING UNIT AND BATTERIES

BACKGROUND OF THE INVENTION

1. Field of the Invention

This invention is related to an information processing unit and batteries, and more particularly, is suitably applied to, for instance, a portable-type personal computer and batteries which are attached thereto.

2. Description of the Related Art

Heretofore, as a portable-type personal computer of this kind, there is so-called laptop personal computer shown in FIG. 1.

In a laptop personal computer 1 thus constructed, on a side surface of the main body division 2 of the rearward direction shown by an arrow x, a display division 3 is held such that it can rotate freely in a direction to approach one surface of the main body division 2 shown by an arrow y (hereinafter, this is referred to as the closing direction) and also in the reverse direction to depart from the one surface of the main body division 2 (hereinafter, this is referred to as the opening direction).

Besides, the one surface of the main body division 2 is provided with a key arrangement division including plural operational keys, and the inner surface of the display division 3 which is opposed to this one surface is provided with a liquid crystal panel 4.

Furthermore, a battery 5 is held on the rear side surface of the main body division 2 such that it can be attached and detached freely, and the main body division 2 and the display division 3 are driven on the basis of the power-supply voltage which is supplied from the battery 5.

By this, in the personal computer 1, when the display division 3 is rotated with respect to the main body division 2 in the closing direction so that one surface of the main body division 2 is closed up with the inner surface of the display division 3, the main body division 2 and the display division 3 are folded as if they are united, and hereby they can be carried easily.

In contrast to this, when the display division 3 is rotated with respect to the main body division 2 in the opening direction so that the key arrangement division and the liquid crystal panel 4 are opened, and besides the main body division 2 and the display division 3 are driven on the basis of the power-supply voltage which is supplied from the battery 5, it becomes capable of inputting a certain operational command via each operational key; on the basis of the inputted operational command, the main body division 2 executes the stated processing, and causes the liquid crystal panel 4 of the display division 3 to display the obtained result of the processing as an image information.

In addition to this, in the personal computer 1, the battery 5 is adapted to rotating freely with respect to the main body division 2 in a direction to approach the other surface of the main body division 2, shown by an arrow z, and also in the reverse direction to depart from the main body division 2.

Therefore, in the personal computer 1, when the battery 5 is rotated with respect to the main body division 2 in the direction to approach the other surface of the main body division 2 at the time of operation of the main body division 2, and hereby caused to stand out from the other surface of the main body division 2, the one surface of the main body division 2 can be tilted at the stated tilt angle with respect to a surface of a desk, for instance; in this way, it is possible to enhance the visibility of the key-arrangement division for the user who is manipulating, and also to improve the operational ease.

By the way, the battery 5, which is used for the personal computer 1 thus constructed, is comprised of certain secondary cells which have been contained within a battery case.

And, recently, such occasions have been increasing that the personal computer 1 is used not only at the carried location but also at the time when a user is carrying it; therefore, there is a tendency to increase the number of secondary cells which are contained within the battery case, so as to increase the capacity of the battery 5, and to elongate the operable time of the personal computer 1 thereby.

However, when the capacity of the battery 5 has been increased in this way, the size of the battery 5 becomes larger in response to increasing of the number of the secondary cells which are contained within the battery case as a result of this, the entire size of the personal computer 1 is enlarged in, for instance, the rearward direction in response to increasing of the size of the battery 5; so, there is such a problem that it can not be carried easily.

SUMMARY OF THE INVENTION

In view of the foregoing, an object of the present invention is to provide an information processing unit which can be carried easily even though batteries have been attached thereto, and also the batteries.

The foregoing object and other objects of the invention have been achieved by the provision of a main body division for executing given information processing; the first battery division which is attached to the first surface on the rear side of the main body division and is standing out from the second surface adjoining the first surface of the main body division; and the second battery division which is held onto an edge portion on the side of the first battery division which the edge portion stands out from the second surface, such that it can rotate freely in a direction to approach the main body division and also in the reverse direction to depart from the main body division, and one surface of the second battery hits the second surface when rotated in the direction to approach the main body division.

As a result of this, at the time of carrying the main body division, it is possible to unite the main body division and the first and the second battery divisions in such a way as to cause the first battery division and the second battery division to lie along the first surface and the second surface of the main body division, respectively.

Besides, the present invention provides the first battery division which is attached to the first surface on the rear side of stated object to attach to and is standing out from the second surface adjoining the first surface of the object to attach to; and the second battery division which is held onto an edge portion on the side of the first battery division which the edge portion stands out from the second surface, such that it can rotate freely in a direction to approach the main body division and also in the reverse direction to depart from the main body division, and one surface of the second battery hits the second surface when rotated in the direction to approach the main body division.

As a result of this, at the time of carrying the attaching object, it is possible to unite the attaching object and the first and the second battery divisions in such a way as to cause the first battery division and the second battery division to lie along the first surface and the second surface of the attaching object, respectively.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
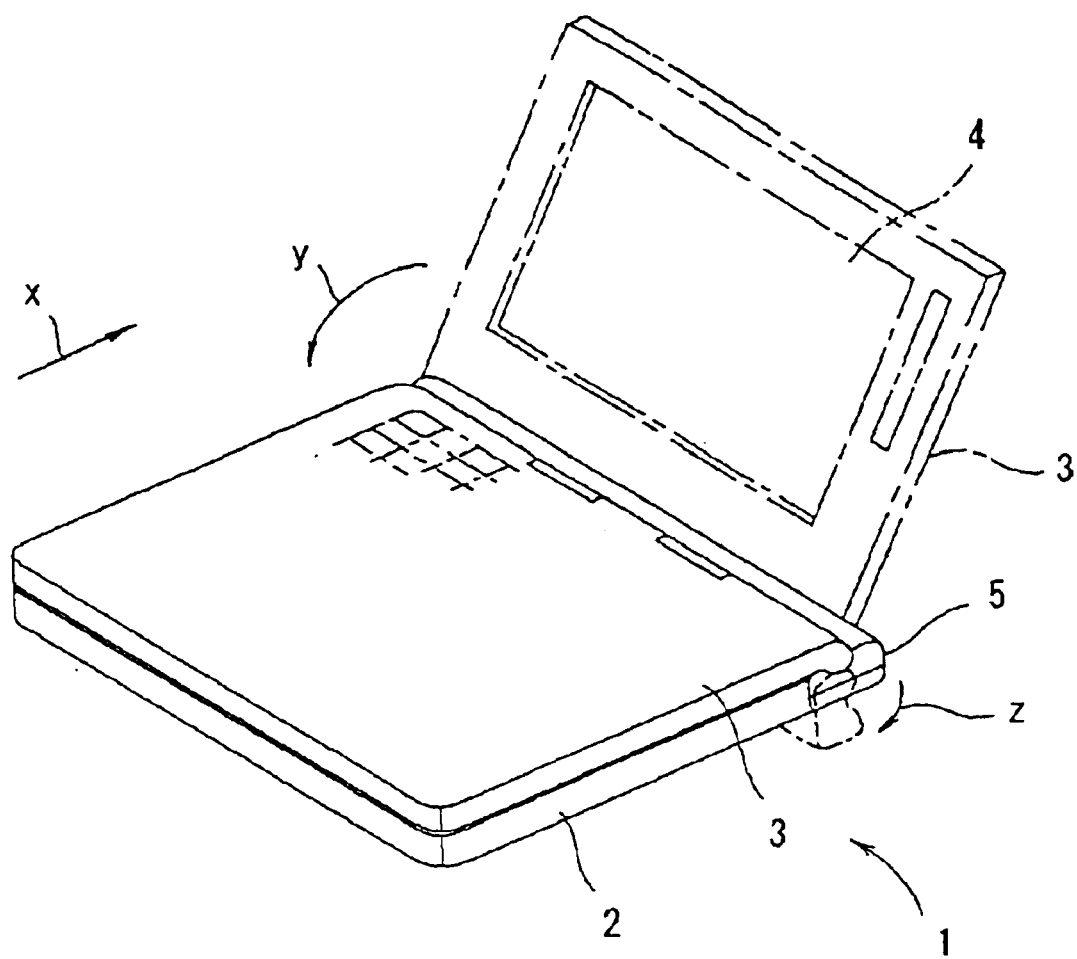
FIG. 1 is a schematic side view showing the configuration of the conventional personal computer.
Figure 2:
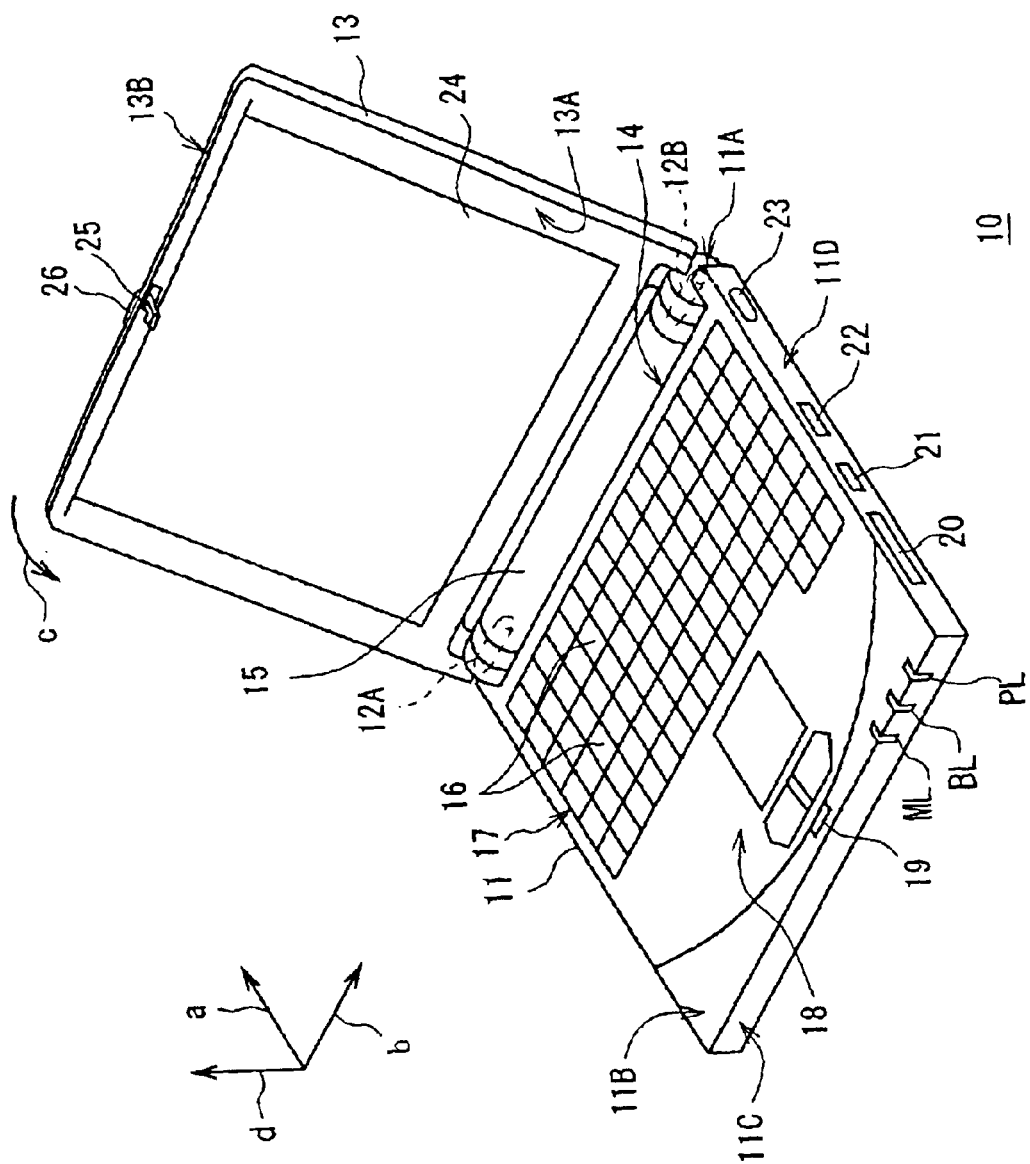
FIG. 2 is a schematic external appearance showing the configuration of a laptop personal computer according to an embodiment of the present invention.

Preferred embodiments of this invention will be described with reference to the accompanying drawings:

Referring to FIG. 2, a laptop personal computer 10 generally designated as 10 to which the present invention has been applied is including a main body division 11 and a display division 13. The first spindles 12A and 12B are respectively placed on the end portion of the right-hand, shown by the arrow b, and the end portion of the left-hand, the reverse direction, of the side surface 11A of the rearward direction shown by the arrow a (hereinafter, this is referred to as the rear side surface) of the main body division 11. The display division 13 is born on the right-hand end portion and the left-hand end portion of the rear side surface 11A such that it is rotatable freely about the first spindles 12A and 12B in the closing direction shown by the arrow c and also in the opening direction, the reverse direction.

Besides, a battery holding division 14 which is a concave portion has been formed between the first spindles 12A and 12B of the rear side surface 11A of the main body division 11; a battery 15 is held within the battery holding division 14 such that it can be attached and detached freely.

Furthermore, the rear end portion of one surface 11B of the main body division 11 is provided with a key arrangement division 17 in which plural operational keys 16 have been arranged; a touch pad 18 is placed on the front end portion of this one surface 11B, and also a hole 19 is made in it.

In addition to this, a pilot lamp PL, a battery lamp BL, and a message lamp ML which are light emitting diodes (LEDS) are placed side by side on the front side surface 11C of the main body division 11; and a card slot 20 for insertion of a personal computer memory card international association (PCMCIA) card (so-called personal computer (PC) card), a power supply switch 21, a programmable power key 22 for sequentially actuating the previously set plural application programs, and an infrared-ray communication port 23 for infrared-ray data communication are placed on the right-hand side surface 11D of the main body division 11, in regular sequence from the front direction to the rearward direction.

As to the display division 13, a liquid crystal panel 24 is placed on the nearly center position of the inner surface 13A which is opposed to the one surface 11B of the main body division 11, and a claw 25 is placed on the end portion of the upward direction, shown by the arrow d, of the inner surface 13A in such a way as to correspond with the hole 19 of the surface 11B of the main body division 11.

And, a slide lever 26 is placed on the upper side surface 13B of the display division 13 such that it would be slid freely in the left-hand and the right-hand directions.

By this, in this personal computer 10, if the display division 13 is rotated with respect to the main body division 11 in the closing direction so as to become such a state that the surface 11B of the main body division 11 is closed up with the inner surface 13A of the display division 13 (hereinafter, this is referred to as the closed state), then the claw 25 of the display division 13 is inserted in the hole 19 of the main body division 11 so as to hold it; in this way, the main body division 11 and the display division 13 are folded as if they are united into an integrated one, and so a user can carry it easily.

On the other hand, when the slide lever 26 is slid to the right, for instance, in the closed state of the display division 13 with respect to the main body division 11, the latching of the claw 25 and the hole 19 can be released, and hereby a user is able to rotate the display division 13 in the opening direction against the main body division 11 and to open the key arrangement division 17 and the liquid crystal panel 24.

And, in the personal computer 10, when the power supply switch 21 has been pushed down in a state in which the key arrangement division 17 of the main body division 11 and the liquid crystal panel 24 of the display division 13 have been opened in this manner (hereinafter, this state is referred to as the opened state), the main body division 11 and the display division 13 are driven on the basis of the power-supply voltage which is supplied from the battery 15; upon inputting of a certain operator command via each operational key 16, the main body division 11 executes the stated processing on the basis of this inputted operator command, and then causes the liquid crystal panel 24 of the display division 13 to display the obtained result of the processing as the image information.

Figure 3:
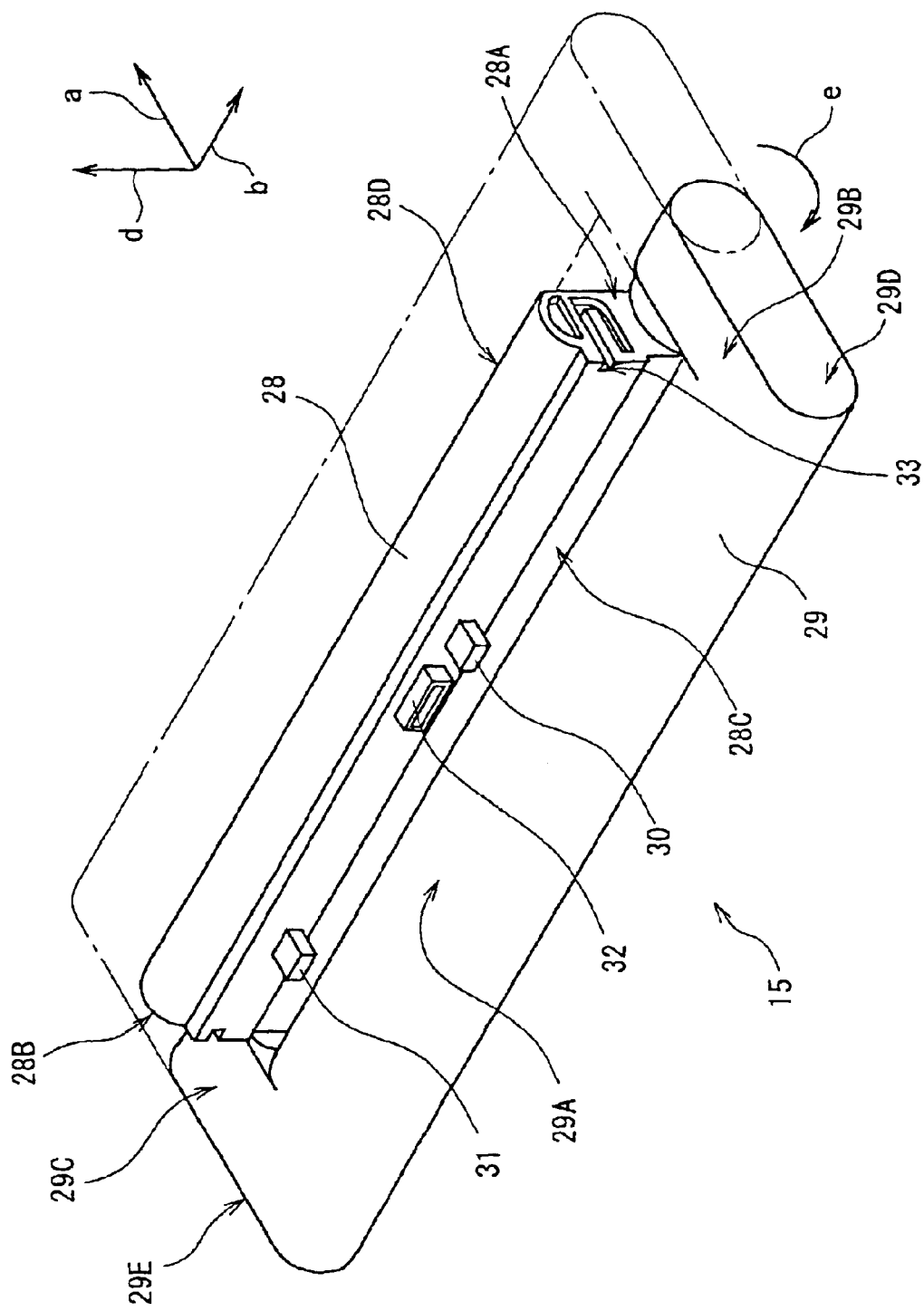
FIG. 3 is a schematic perspective view showing the configuration of batteries.

In addition to such a configuration, the battery 15 of this personal computer 10 is comprised of the first battery case 28 and the second battery case 29, as shown in FIG. 3; the cross section of the bar-shaped first battery case 28 is an ellipse shape; the second battery case 29 is also having the cross section of an ellipse shape, and one surface 29A of the second battery case 29 is U-shaped.

In practice, in this battery 15, the second battery case 29 is held on the lower end portions of one end 28A and the other end 28B of the first battery case 28, in such a manner that it can rotate freely by means of its leg portions 29B and 29C, with respect to the first battery case 28, in a direction to cause this one surface 29A of the second battery case 29 to approach one surface 28C of the first battery case 28 shown by the arrow e (hereinafter, this is referred to as the clockwise direction) and also in the reverse direction to cause the one surface 29A of the second battery case 29 to depart from this one surface 28C of the first battery case 28 (hereinafter, this is referred to as the counterclockwise direction).

And, a rotational mechanism, not shown, whose rotating range is practically limited is placed on the lower end portions of this one end 28A and the other end 28B of the first battery case 28; hereby the second battery case 29 is freely rotatable all the way from the first state to the second state; in the first and the second states, the longitudinal direction of the end 28A and the other end 28B of the first battery case 28 (hereinafter, this is referred to as the first end-surface longitudinal direction) is orthogonal to the longitudinal direction of the end surfaces 29D and 29E of the second battery case 29 (hereinafter, this is referred to as the second end-surface longitudinal direction); in the first state, the second battery case 29 stands out from the one surface 28C of the first battery case 28 in the forward direction, on the other hand, it stands out from the other surface 28D of the first battery case 28 rearward in the second state.

Besides, within the first battery case 28, plural secondary cells such as lithium ion secondary cells are contained, and, within the second battery case 29 too, plural secondary cells such as lithium ion secondary cells are contained; the respective secondary cells in the first and the second battery cases 28 and 29 are connected, for conduction of electricity, to a circuit board which has been placed within the first battery case 28.

Moreover, on the upper end portion of the on surface 28C of the first battery case 28, the first and the second protrusions 30 and 31 and a connector 32 of the case side are placed; the case-side connector 32 is connected, for conduction of electricity, to the respective secondary cells in the first and the second battery cases 28 and 29 via the internal circuit board.

And, on the upper end portions of the end 28A and the other end 28B of the first battery case 28, slotted portions 33 are formed in such a manner that their longitudinal directions are nearly parallel to the back-and-forth direction.

Figure 4:
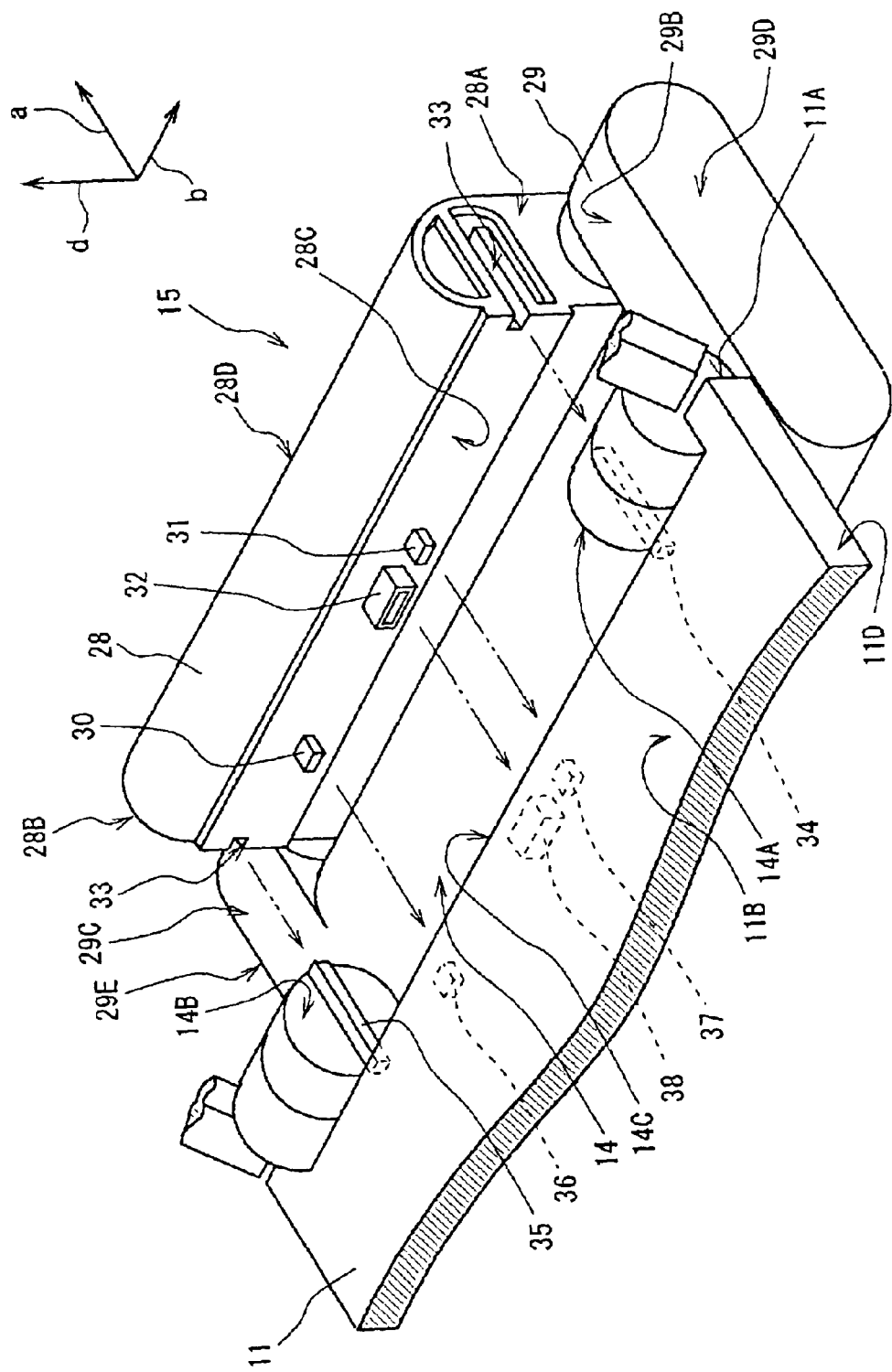
FIG. 4 is a schematic perspective view employed for explanation of attaching the batteries to the battery holding division.

As to the rear side surface 11A of the main body division 11, as shown in FIG. 4, on the right-hand inner surface 14A and the left-hand inner surface 14B of the battery holding division 14, bar-shaped guide rails 34 and 35 which accord with the slotted portions 33 of the first battery case 28 are respectively formed in such a manner that their longitudinal directions are nearly parallel to the back-and-forth direction; besides, on the bottom surface 14C of the battery holding division 14, the first hole 36 and the second hole 37 which accord with the first protrusion 30 and the second protrusion 31 of the first battery case 28 are made, and also a main-body-side connector 38 which accords with the case-side connector 32 is placed.

And, as to the battery 15, the upper end portion of the one surface 28C of the first battery case 28 is opposed to the bottom surface 14C of the battery holding division 14 of the main body division 11, so as to insert the corresponding guide rails 34 and 35 into the respective slotted portions 33; in this state, the first battery case 28 is caused to move in a direction to approach the battery holding division 14 and to insert the guide rails 34 and 35 within the respective slotted portions 33, therefore, the surface 28C of the first battery case 28 is caused to hit the bottom surface 14C of the battery holding division 14; in this way, the first protrusion 30 and the second protrusion 31 are caused to fit into the corresponding first hole 36 and the second hole 37, and the case-side connector 32 is caused to connect to the main-body-side connector 38 mechanically and electrically.

Figure 5:
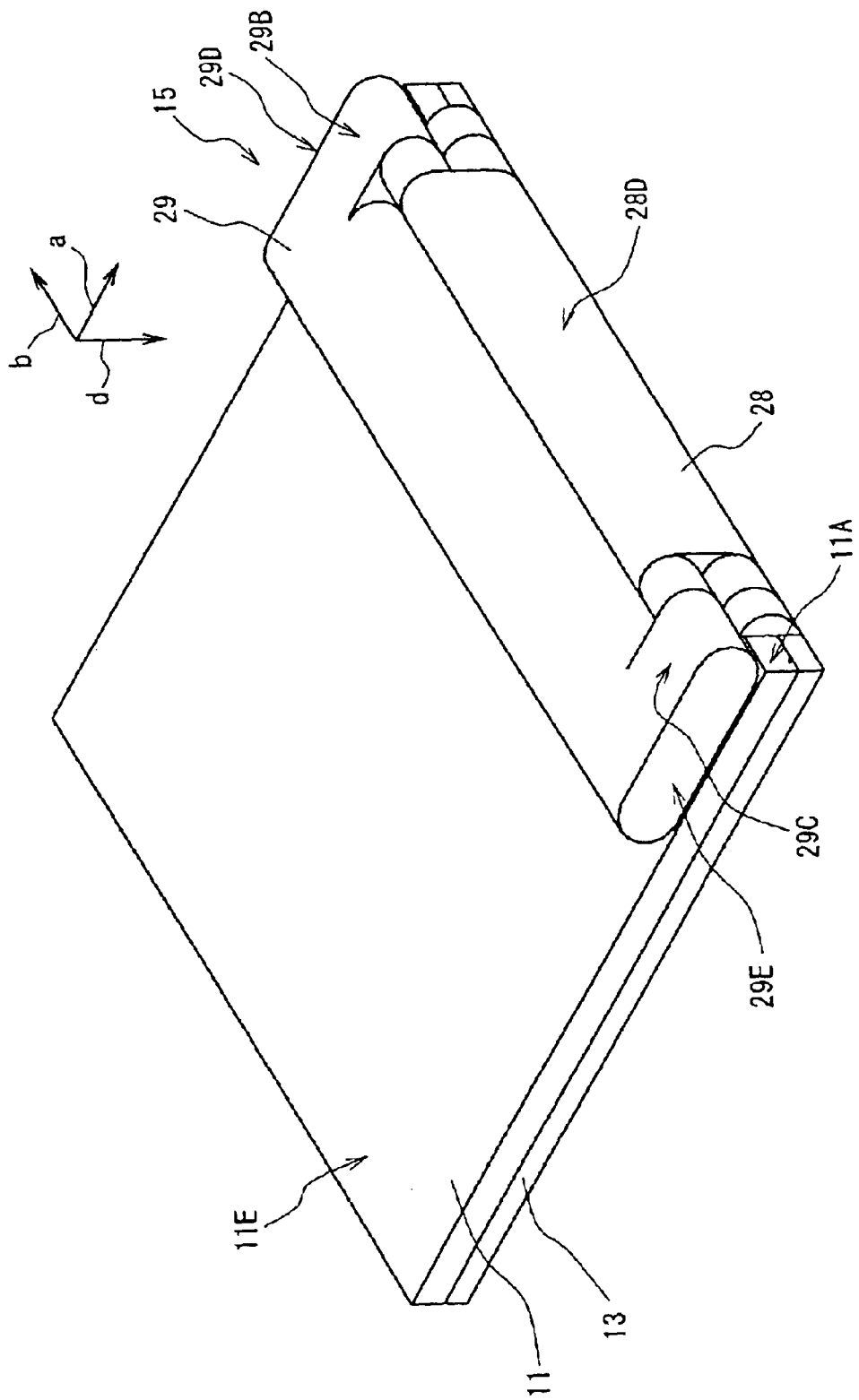
FIG. 5 is a schematic perspective view employed for explanation of attaching the batteries to the main body division.

By this, as shown in FIG. 5, the battery 15 is held on the rear side surface 11A of the main body division 11 by means of the first battery case 28, in such a manner that it can be attached and detached optionally; in the held state, the battery 15 is able to supply the power-supply voltage to the inside of the main body division 11 via the case-side connector 32 and the main-body-side connector 38 sequentially, and also able to supply the power-supply voltage to the inside of the display division 13 via the main body division 11.

In this connection, the battery 15 is held by means of certain holding mechanisms which have been placed inside the first and the second holes 36 and 37 which correspond to the first and the second protrusions 30 and 31 at this time in such a manner that it can be attached and detached optionally; by this, it is possible to prevent falling out of the main body division 11.

And, a slide lever, not shown, for releasing the holding of the first and the second protrusions 30 and 31 which have been held in the first and the second holes 36 and 37 is placed on the other surface 11E of the main body division 11; by causing this slide lever to slide, the holding of the first and the second protrusions 30 and 31 in the first and the second holes 36 and 37 is released, and then, by causing the battery 15 to transfer in a direction to depart from the battery holding division 14 in this state, the battery 15 can be removed from the main body division 11.

Besides, at the time of attaching and detaching of the battery 15 to and from the main body division 11, by inserting the guide rails 34 and 35 into the slotted portions 33 of the first battery case 28 thereby restricting the moving direction of the battery 15 to allow to move only in the back-and-forth direction, it is possible to surely fit the first and the second protrusions 30 and 31 and the case-side connector 32 into the corresponding first and the second holes 36 and 37 and the main-body-side connector 38 at the time of attaching, and besides, it is possible to surely prevent the first and the second protrusions 30 and 31 and the case-side connector 32 from moving, for instance, in the up-and-down direction with respect to the corresponding first and the second holes 36 and 37 and the main-body-side connector 38 and thereby being broken at the time of detaching.

Figure 6:
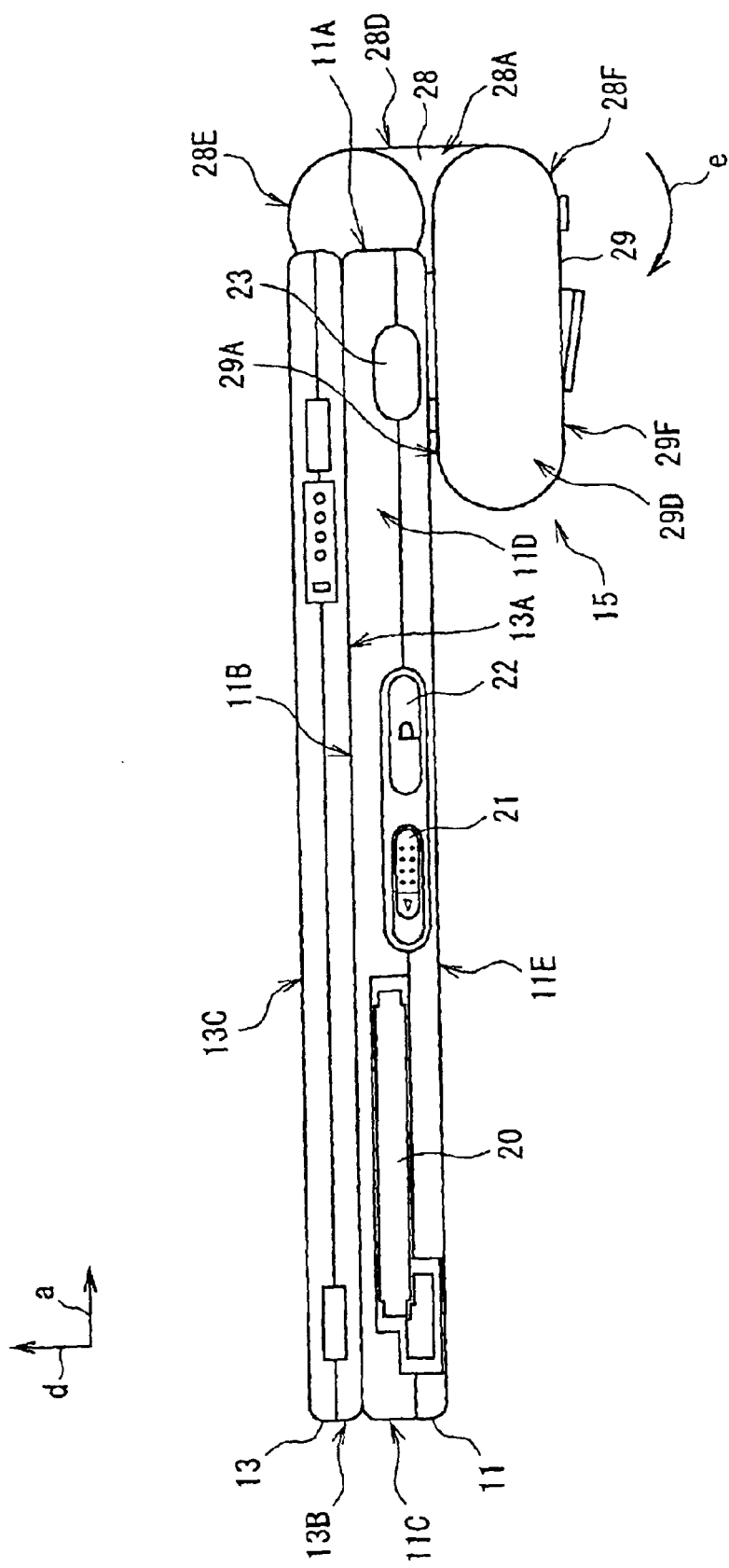
FIG. 6 is a schematic side view employed for explanation of the batteries at the time when it is attached to the personal computer and carried.

At here, in the battery 15, as shown in FIG. 6, the longitudinal size of the first battery case 28 is set to nearly two times the total thickness of the main body division 11 and the display division 13 of their closed state.

And, the first battery case 28 is attached to the main body division 11, in such a manner that the summit of the arcwise-shaped upper side surface 28E of the first battery case 28 nearly meets the virtual surface which has been extrapolated from the other surface 13C of the display division 13 which is staying in the closed state with respect to the main body division 11, and besides, the lower end portion stands out from the lowermost end portion of the rear side surface 11A of the main body division 11 toward the other surface 11E.

Besides, the thickness of the second battery case 29 is set to the nearly same value as that of the total thickness of the main body division 11 and the display division 13 which are staying in the closed state, and the rotational center position of the second battery case 29 is set to the stated position which lies in the oblique and beneath direction of the rear side surface 11A of the main body division 11 in such a manner that, when the second end-surface longitudinal direction has been caused to be orthogonal to the first end-surface longitudinal direction of the first battery case 28, the one surface 29A or the other surface 29F nearly meets the summit of the arcwise-shaped bottom side surface 28F of the first battery case 28.

Therefore, in the battery 15, plural secondary cells are contained within the first battery case 28 and plural secondary cells are contained within the second battery case 29 too, and so the capacity can be remarkably increased; in addition, at the time of carrying the personal computer 10, the second battery case 29 is caused to rotate with respect to the first battery case 28 in a clockwise direction to approach the other surface 11E of the main body division 11, and so the battery 15 is folded into L-shape, and the one surface 29A of the second battery case 29 is caused to hit the other surface 11E of the main body division 11, in this way, the battery 15 is caused to lie along the rear side surface and the other surface 11E of the main body division 11, such that the main body division 11 and the display division 13 which are staying in the closed state and the battery 15 are united as if they are integrated into one thing, and so the portability of the personal computer 10 can be improved.

Figure 7:
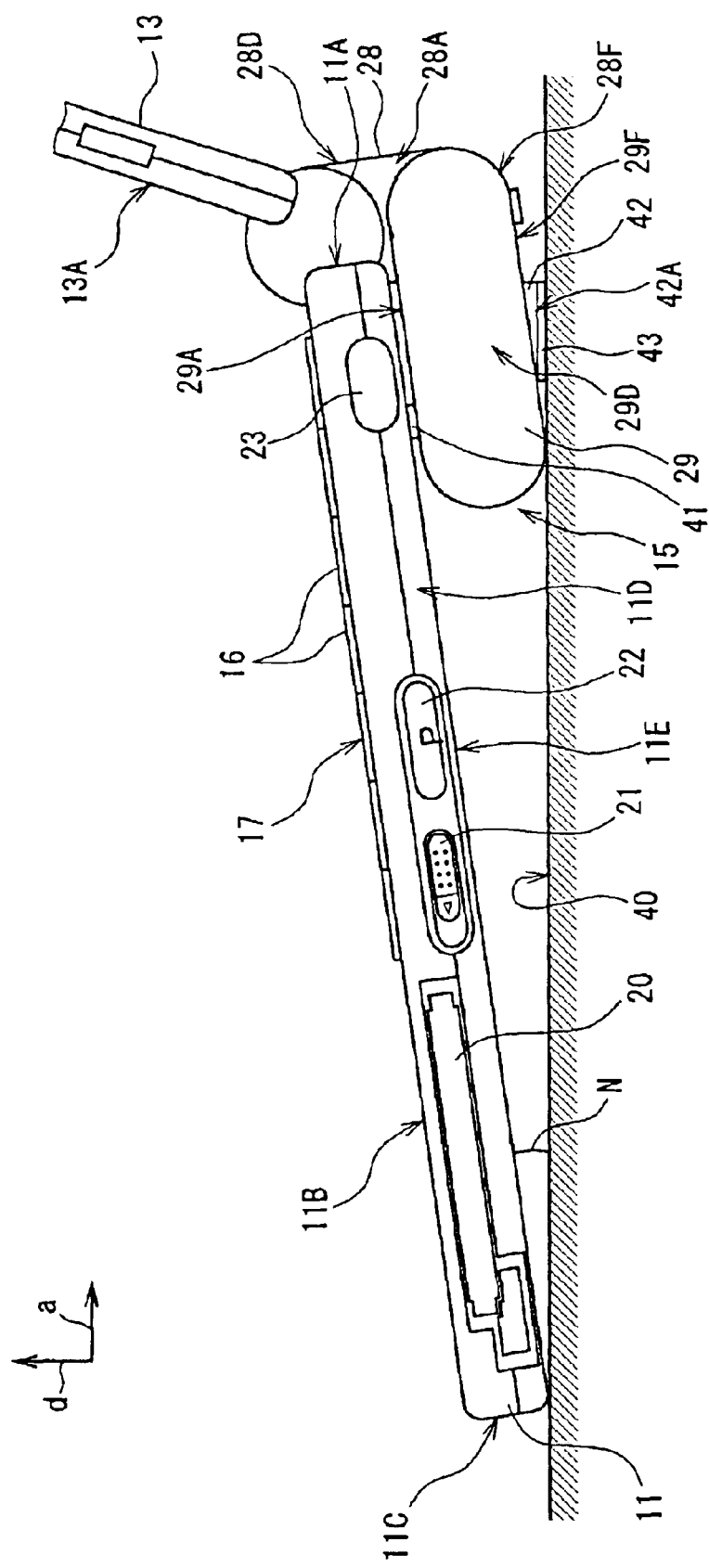
FIG. 7 is a schematic side view employed for explanation of the inclination of the main body division due to the batteries.

By the way, at the time of manipulation of the main body division 11, as shown in FIG. 7, a user may cause the second battery case 29 to rotate with respect to the first battery case 28 in a clockwise direction and to approach the other surface 11E of the main body division 11, and cause the one surface 29A of the second battery case 29 to hit the other surface 11E of the main body division 11, and cause the front end portion of the other surface 29F of this second battery case 29 to hit a supporting surface 40 such as a surface of a desk, in this way, he is able to tilt the one surface 11B of the main body division 11 with respect to the supporting surface 40 at the first tilt angle M.

In this connection, the first elastic members 41 such as rubber sheets which have comparatively large frictional resistance are glued to the respective left-hand end portion and right-hand end portion of the one surface 29A of the second battery case 29 at this time; because these first plastic members 41 are pushed to the other surface 11E of the main body division 11, the second battery case 29 do not rattle with respect to the main body division 11 at the time of manipulation of the plural operational keys 16.

Besides, on the left-hand and the right-hand end portions of the other surface 29F of the second battery case 29, wedge type legs 42 are placed in such a manner that their slanting surfaces 42A are directed downward; the second elastic members 43 such as rubber sheets which have comparatively large frictional resistance are glued to the slanting surfaces 42A of the leg portions 42.

And, this battery 15 is pressing the entire slanting surfaces 42A of the legs 42 on the supporting surface 40 via the second elastic members 43, by means of the weight of the battery 15 itself and the weight of the main body division 11.

By this, in this battery 15, even though vibration has been applied to the main body division 11 owing to key manipulation, it is possible to prevent the main body division 11 from slipping upon the supporting surface 40 by virtue of the second elastic members 43 which have been placed on the legs 42 of the second battery case 29.

In this connection, the legs 42 of the other surface 29F of the second battery case 29 are placed at the stated positions that are opposed to the rear end portion of the one surface 11B of the main body division 11, and so, when an operational key 16 which has been located on the rear end portion of the key arrangement division 17 of the main body division 11 has been depressed, the legs 42 would catch the external force which is applied to the rear end portion of the one surface 11B of the main body division 11 in the downward direction.

By this, even though an operational key 16 which has been located on the rear end portion of the key arrangement division 17 has been depressed, the rear end portion of the other surface 29F of the second battery case 29 is pressed on the supporting surface 40, and so it is possible to prevent the front end portion of the main body division 11 from being lifted and to prevent the operational ease from deteriorating, in this way, the main body division 11 can be placed on the supporting surface 40 with stabilization, during its manipulation.

Figure 8:
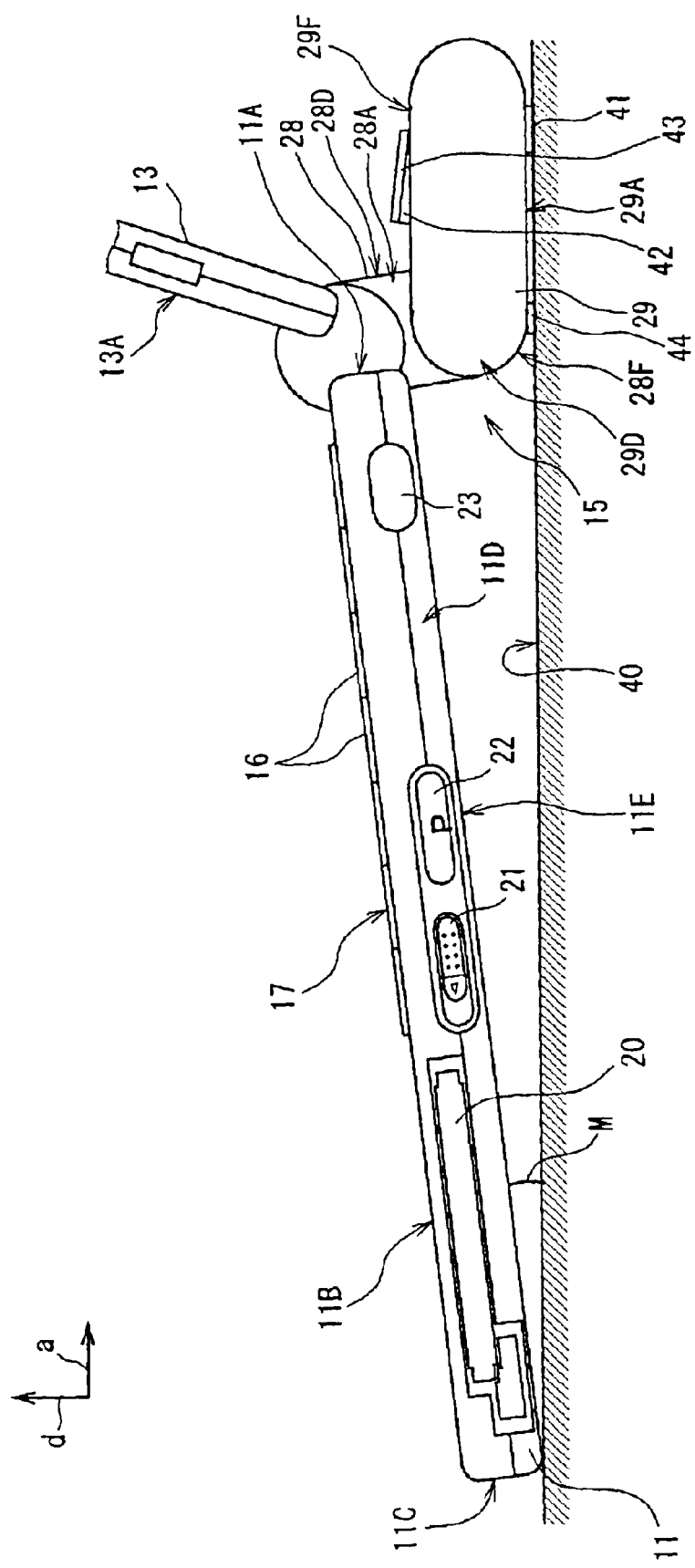
FIG. 8 is a schematic side view employed for explanation of the inclination of the main body division due to the batteries.

On the other hand, at the time of manipulation of the main body division 11, as shown in FIG. 8, a user may cause the second battery case 29 to rotate with respect to the first battery case 28 in a counterclockwise direction and to depart from the other surface 11E of the main body division 11, and cause the whole surface of the one surface 29A of the second battery case 29 to hit the supporting surface 40 for instance, in this way, he is able to cause the one surface 11B of the main body division 11 to incline, with respect to the supporting surface 40, at the second tilt angle N that is smaller than the first tilt angle M.

And, at the time when the one surface 11B of the main body division 11 has been tilted at the second tilt angle N in this manner, the first elastic members 41 of the second battery case 29 are pressed on the supporting surface 40 by virtue of the weight of the battery 15 itself, and the third elastic members 44 such as rubber sheets having comparatively large frictional resistance which have been glued to the arcwise-shaped lower end surface of the first battery case 28 are also pressed on the supporting surface 40.

By this, in this battery 15, even though vibration has been applied to the main body division 11 due to key manipulation, it is possible to prevent the main body division 11 from slipping upon the supporting surface 40 by virtue of the first and the third elastic members 41 and 44, so as to place and to stabilize the main body division 11 on the supporting surface 40.

Thus, in this battery 15, at the time of manipulation of the main body division 11, by rotating the second battery case 29 with respect to the first battery case 28, the tilt angle of the on surface 11B of the main body division 11 can be switched between two stages by means of the battery 15, so that a user is able to select either tilt angle which he prefers to apply to manipulating the operational keys 16, and to improve the ease of use.

Besides, in the battery 15, because the center of rotating of the second battery case 29 with respect to the first battery case 28 has been set to the stated position which lies in the oblique and beneath direction of the rear side surface 11A of the main body division 11, at the time when the second battery case 29 has been caused to rotate relative to the first battery case 28 in the counterclockwise direction to depart from the other surface 11E of the main body division 11 and the one surface 11B of the main body division 11 has been hereby caused to tilt at the second tilt angle N, the second battery case 29 which is standing out rearward from the other surface 28D of the first battery case 28 can be located beneath than the other surface 11E of the main body division 11.

Therefore, in this personal computer 10, even though the one surface 11B of the main body division 11 has been tilted at the second tilt angle N, the display division 13 can be rotated relative to the main body division 11 over 180 degree or more in the opening direction, in this way, a user who is manipulating the operational keys 16 at the front side of the main body division 11 is able to show the image information which is displayed by the user's manipulation on the liquid crystal panel 24 of the display division 13 to the other person who is staying in the rear side of the display division 13 and is opposed to the user.

In the above configuration, the battery 15 of the personal computer 10 is attached to the main body division 11, in such a manner that the second battery case 29 is held on the lower end portions of the one end 28A and the other end 28B of the first battery case 28 such that it can rotate freely, and the upper end portion of the one surface 28C of the first battery case 28 is held on the battery holding division 14 of the rear side surface 11A of the main body division 11 such that it can be attached and detached optionally.

And, in the personal computer 10, at the time when it is carried, the second battery case 29 is caused to rotate relative to the first battery case 28 in a clockwise direction to approach the other surface 11E of the main body division 11, and so the one surface 29A of the second battery case 29 is caused to hit the other surface 11E of the main body division 11.

Therefore, at the time of carrying the personal computer 10, the battery 15 can be folded into L-shape and caused to lie along the rear side surfaces of the main body division 11 and the display division 13 which are staying in the closed state as well as the other surface 11E of the main body division 11, as a result of this, it is possible to prevent the entire personal computer 10 from greatly growing in size rearward and to integrate this battery 15 with the main body division 11 and the display division 13.

Besides, since the battery 15 is integrated with the main body division 11 and the display division 13, if the thickness of the first battery case 28 and the thickness of the second battery case 29 are increased respectively in a direction which is orthogonal to the first end-surface longitudinal direction and in a direction which is orthogonal to the second end-surface longitudinal direction, or if the width of the second battery case 29 is widened in a direction which is parallel to the second end-surface longitudinal direction, it is possible to further increase the number of secondary cells contained within the first and the second battery cases 28 and 29 of the battery 15 and to increase the capacity easily, without harming the integration of the main body division 11, the display division 13 and the battery 15 of the time of carrying the personal computer 10.

According to the above configuration, in the battery 15, the second battery case 29 is held on the lower end portions of the one end 28A and the other end 28B of the first battery case 28 such that it can rotate freely, and the upper end portion of the one surface 29A of the first battery case 28 is held on the battery holding division 14 of the main body division 11, and, at the time when it is carried, the second battery case 29 is caused to rotate relative to the first battery case 28 in a clockwise direction to approach the other surface 11E of the main body division 11, and so the one surface 29A of the second battery case 29 is caused to hit the other surface 11E of the main body division 11, therefore, at the time of carrying, the battery 15 is caused to lie along the rear side surfaces and the other surface 11E of the main body division 11, and integrated with the main body division 11 and the display division 13 which are staying in the closed state, in this way, a personal computer which can be easily carried even if the batteries have been attached can be realized.

In the above-mentioned embodiment, such an aspect has been described that, in the battery 15, the second battery case 29 having the cross section of an ellipse shape is held on the first battery case 28 in such a manner that it can be rotated freely; however, we do not intend to limit the present invention to such; a second battery case having the other various shapes of cross section may be held on the first battery case 28 in such a manner that it can be rotated freely, for instance, a second battery case having a wedge-shaped cross section or a second battery case having a L-shaped cross section may be held on the first battery case 28.

In this connection, in the case of a second battery case having a wedge-shaped cross section, if one surface and/or the other surface is tapered to become smaller toward the front end portion, it is possible to prevent the sense of togetherness with the main body division 11 and the display division 13 which are staying in the closed state from being harmed; on the other hand, in the case of a second battery case having a L-shaped cross section, if its rotational center position is set to the stated position of the rear side of the rear side surface 11A of the main body division 11, it is possible to cause this second battery case 29 to lie along the rear side surface 11A and the other surface 11E of the main body division 11 at the time when the personal computer is carried, and to prevent the sense of togetherness with the main body division 11 and the display division 13 which are staying in the closed state from being harmed; in this way, it is possible to improve the portability of a personal computer to which the battery has been attached in the same way as the above-mentioned embodiment, even though the shape of the cross section of the second battery case has been thus changed.

Besides, in the above-mentioned embodiment, such an aspect has been described that, when the battery 15 is attached, the summit of the arcwise-shaped upper side surface 28E of the first battery case 28 is caused to nearly meet the virtual surface which has been extrapolated from the other surface 13C of the display division 13 which is staying in the closed state with respect to the main body division 11; however, we do not intend to limit the present invention to such; so long as the display division 13 can be rotated freely in the opening direction related to the main body division 11, the upper side surface 28E of the first battery case 28 may be positioned at the other various positions; for instance, the summit of the upper side surface 28E may be caused to nearly meet the one surface 11B of the main body division 11.

Moreover, in the above-mentioned embodiment, such an aspect has been described that the thickness of the second battery case 29 is set to the nearly same value as that of the total thickness of the main body division 11 and the display division 13 which are staying in the closed state; however, we do not intend to limit the present invention to such; so long as the one surface of the second battery case hits the other surface 11E of the main body division 11 at the time when the second battery case has been rotated relative to the first battery case in clockwise direction, the thickness can be set to the other various value of thickness.

Moreover, in the above-mentioned embodiment, such an aspect has been described that, when the second end-surface longitudinal direction has been caused to be orthogonal to the first end-surface longitudinal direction of the first battery case 28, the one surface 29A or the other surface 29F nearly meets the summit of the arcwise-shaped bottom side surface 28F of this first battery case 28; however, we do not intend to limit the present invention-to such; so long as the one surface of the second battery case is able to hit the other surface 11E of the main body division 11 at the time when the second battery case has been rotated with respect to the first battery case in clockwise direction, the one surface 29A or the other surface 29F of the second battery case 29 may be positioned above or beneath the bottom side surface 28F of the first battery case 28 at the time when the second end-surface longitudinal direction has been caused to be orthogonal to the first end-surface longitudinal direction of the first battery case 28.

Moreover, in the above-mentioned embodiment, such an aspect has been described that the present invention is applied to the above-mentioned laptop personal computer 10 and to the battery 15 which is attached to it; however, we do not intend to limit the present invention to such; the present invention can be broadly applied to other various information processing units which are attaching objects of a battery, similar to electronic equipment such as a portable-type information communicating terminal and a portable-type image displaying unit, and to a battery which can be attached to them.

Moreover, in the above-mentioned embodiment, such an aspect has been described that the main body division 11 of the laptop personal computer 10 is employed as the main body division for executing the stated information processing; however, we do not intend to limit the present invention to such; the other wide variety of main body divisions can be employed, such as a portable-type information communicating terminal whose one surface has been provided with a display panel along with an input division adapted for inputting the various operator commands.

Moreover, in the above-mentioned embodiment, such an aspect has been described that the first battery case 28 in which plural secondary cells have been contained of the battery 15 is employed as the first battery division which has been attached to the stated first surface of the main body division; however, we do not intend to limit the present invention to such; the other wide variety of first battery division such as the first battery division which is comprised of a large size secondary cell can be employed, so long as it can be attached to the first surface of the main body division.

Moreover, in the above-mentioned embodiment, such an aspect has been described that the rear side surface 11A of the main body division 11 is employed as the stated first surface of the main body division to which the first battery is attached; however, we do not intend to limit the present invention to such; the other various surfaces, such as the front side surface 11C, the left-hand and the right-hand side surfaces 11D, and the other surface 11E of the main body division 11, may be employed as the first surface, so long as the first battery can be attached to them.

Moreover, in the above-mentioned embodiment, such an aspect has been described that the second battery case 29 containing the plural secondary cells of the battery 15 is employed as the second battery division which is held on the first battery division such that it can rotate freely in the direction to approach the main body division and also in the reverse direction to depart from the main body division and one surface of it is caused to hit the second surface which is adjoining the first surface of the main body division when it has been rotated with respect to the first battery division in a direction to approach the main body division; however, we do not intend to limit the present invention to such; the other wide variety of second battery divisions such as a second battery division which is formed by a large size secondary cell can be employed, so long as it can be held on the first battery division such that it can rotate freely in the direction to approach the main body division and also in the departing direction reversely and one surface of it is able to hit the second surface which is adjoining the first surface of the main body division when it has been rotated relative to the first battery division in the direction to approach the main body division.

Moreover, in the above-mentioned embodiment, such an aspect has been described that the other surface 11E of the main body division 11 is employed as the second surface, adjoining the first surface of the main body division, which is struck by one surface of the second battery division when the second battery division has been rotated relative to the first battery division in a direction to approach the main body division; however, we do not intend to limit the present invention to such; the other various surfaces, such as the rear side surface 11A, the front side surface 11C, and the left-hand and the right-hand side surfaces 11D of the main body division 11, can be employed as the second surface, so long as they can be struck by one surface of the second battery division when the second battery division has been rotated relative to the first battery division in the direction to approach the main body division.

As described above, the present invention provides: a main body division for executing given information processing; the first battery division which is attached to the first surface on the rear side of the main body division and is standing out from the second surface adjoining the first surface of the main body division; and the second battery division which is held onto an edge portion on the side of the first battery division which the edge portion stands out from the second surface, such that it can rotate freely in a direction to approach the main body division and also in the reverse direction to depart from the main body division, and one surface of the second battery hits the second surface when rotated in the direction to approach the main body division: therefore, at the time of carrying the main body division, the first and the second battery divisions can be caused to lie along the first and the second surfaces of the main body division so that the first and the second battery divisions can be integrated with the main body division; in this way, it is possible to realize an information processing unit which can be easily carried even if the battery has been attached to it.

Besides, proposed are the first battery division which is attached to the first surface on the rear side of stated object to attach to and is standing out from the second surface adjoining the first surface of the object to attach to; and the second battery division which is held onto an edge portion on the side of the first battery division which the edge portion stands out from the second surface, such that it can rotate freely in a direction to approach the main body division and also in the reverse direction to depart from the main body division, and one surface of the second battery hits the second surface when rotated in the direction to approach the main body division: therefore, at the time of carrying the attaching object, the first and the second battery divisions can be caused to lie along the first and the second surfaces of the attaching object so that the first and the second battery divisions can be integrated with the attaching object; in this way, it is possible to realize a battery for being attached to the attaching object, wherein the object to which the battery has been attached can be easily carried.

While there has been described in connection with the, preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information processing unit comprising:

a main body housing circuitry for executing information processing;

a first battery case attached to a first surface on a rear side of said main body so as to stand out from a second surface adjoining said first surface of said main body division;

first, second, and third elastic members, said third elastic member being affixed to a lower surface of said first battery case; and a second battery case having first and second flat surfaces and leg portions attached to respective edge portions on respective sides of said first battery case that stand out from said second surface of said main body housing, said leg portions being rotatably attached to said respective sides of said first battery case so that said second battery case is free to rotate in a direction to approach said second surface of said main body and also to rotate in a reverse direction to move away from said second surface of said main body, wherein said first flat surface of said second battery case has said first elastic member affixed thereto, so that said first elastic member comes into contact with and lies against said second surface of said main body housing when rotated fully in the direction to approach said second surface of said main body housing, and said second flat surface of said second battery case has said second elastic member affixed thereto, so that said second elastic member rests on a supporting surface in a first operating mode, and said first elastic member affixed to said first flat surface of the second battery case and said third elastic member rest on the supporting surface when the second battery case is rotated fully in the reverse direction in a second operating mode.

2. The information processing unit according to claim 1, wherein said first battery case is provided with an electrical connection terminal and is electrically connected to said main body via said electrical connection terminal.

3. The information processing unit according to claim 2, wherein when said second elastic member affixed to said second flat surface of said second battery case rests on said supporting surface, said main body is caused to incline at a first tilt angle relative to said supporting surface, and when first elastic member affixed to said first flat surface of said second battery case and said third elastic member rest on said supporting surface, said second battery case causes said main body to incline relative to said supporting surface at a second tilt angle smaller than said first tilt angle.

4. The information processing unit according to claim 2, wherein said main body has a plurality of operational keys arranged on a third surface opposed to said second surface.

5. The information processing unit according to claim 4, comprising display means provided with a display panel on an inner surface thereof opposed to said third surface of said main body, wherein said display means is rotatably attached to said main body such that said display means rotates freely so as to close said third surface with inner surface of said display means and to open the third surface.

6. The information processing unit according to claim 5, wherein when said second elastic member affixed to said second flat surface of said second battery case rests on said supporting surface, said main body is caused to incline at a first tilt angle relative to said supporting surface, and when said first elastic member affixed to said first flat surface of said second battery case and said third elastic member rest on said supporting surface, said second battery case causes said main body to incline relative to said supporting surface at a second tilt angle smaller than said first tilt angle.

7. The information processing unit according to claim 5, wherein said first battery case is arranged to be attached or detached by at least one set of hinges that rotatably supports said display means on said main body to thereby open and close said display means.

8. The information processing unit according to claim 7, wherein said first battery case is attached or detached to said hinges of said main body division by being slid in or out, respectively.

9. The information processing unit according to claim 8, wherein said first battery case is provided with guide rails on both sides of edge portions opposite the edge portion rotatably holding said second battery division.

10. The information processing unit according to claim 9, wherein when said second elastic member affixed to said second flat surface of said second battery case rests on said supporting surface, said main body is caused to incline at a first tilt angle relative to said supporting surface, and when said first elastic member affixed to said first flat surface of said second battery case and said third elastic member rest on said supporting surface, said second battery case causes said main body to incline relative to said supporting surface at a second tilt angle smaller than said first tilt angle.

11. The information processing unit according to claim 1, wherein said second battery case is rotatably attached to said first battery case by a pair of rotational mechanisms provided on both sides in a longitudinal direction of the edge portions of said first battery case.

12. The information processing unit according to claim 11, wherein when said first elastic member affixed to said first flat surface of said second battery case and said third elastic member rest on said supporting surface; said main body is caused to incline at a first tilt angle relative to said supporting surface, and when said second elastic member affixed to said second flat surface of said second battery case rests on said supporting surface, said second battery case causes said main body to incline relative to said supporting surface at a second tilt angle smaller than said first tilt angle.

13. The information processing unit according to claim 11, comprising display means provided with a display panel on an inner surface thereof opposed to a third surface of said main body whereat reside a plurality of operational keys, wherein said display means is rotatably attached to said main body such that said display means rotates freely so as to close said third surface with the inner surface of said display means and to open the third surface.

14. The information processing unit according to claim 13, wherein
said first battery case is attached or detached by at least one set of hinges that supports said display means on said main body to thereby open and close said display means.

15. The information processing unit according to claim 14, wherein
said first battery case is attached or detached to said hinges of said main body by being slid in or out, respectively.

16. The information processing unit according to claim 1, wherein
when said second elastic member affixed to said second flat surface of said second battery case rests on said supporting surface; said main body is caused to incline at a first tilt angle relative to said supporting surface, and when said first elastic member affixed to said first flat surface of said second battery case and said third elastic member rest on said supporting surface and said second battery case causes said main body to incline relative to said supporting surface at a second tilt angle smaller than said first tilt angle.

17. A battery assembly comprising
a first battery case attached to a first surface on a rear side of a main body of an object using the battery assembly so as to stand out from a second surface adjoining said first surface of said main body;

first, second, and third elastic members, said third elastic member being affixed to a lower surface of said first battery case; and a second battery case having first and second flat surfaces and leg portions attached to respective edge portions on respective sides of said first battery case that stand out from said second surface of said main body, so that said second battery case rotates freely in a direction to approach said second surface of said main body and also in a reverse direction to move away from said second surface of said main body, wherein said first flat surface of said second battery case has said first elastic member affixed thereto, so that said first elastic member comes into contact with and lies against said second surface of said main body housing when rotated fully in the direction to approach said second surface of said main body, said second flat surface of said second battery case has said second elastic member affixed thereto, so that said second elastic member rests on a supporting surface in a first operating mode, and said first elastic member affixed to said first flat surface of said second battery case and said third elastic member rest on the supporting surface when said second battery case is rotated fully in the reverse direction in a second operating mode.

18. The battery assembly according to claim 17, wherein
said first battery case has an electrical connection terminal on a part thereof that hits said first surface of said object.

19. The battery assembly according to claim 18, wherein
said first battery case is provided with guide rails on both sides of edge portions opposite to the edge portions rotatably holding said second battery case, and can be attached or detached by being respectively slid in or out on said object.

20. The battery assembly according to claim 18 or 19, wherein
said first battery case is provided with rotational mechanisms for holding said second battery case rotatably on both sides longitudinally of the edge portions of said first battery case attached to and standing out from said object.

* * * * *